Patented June 20, 1939

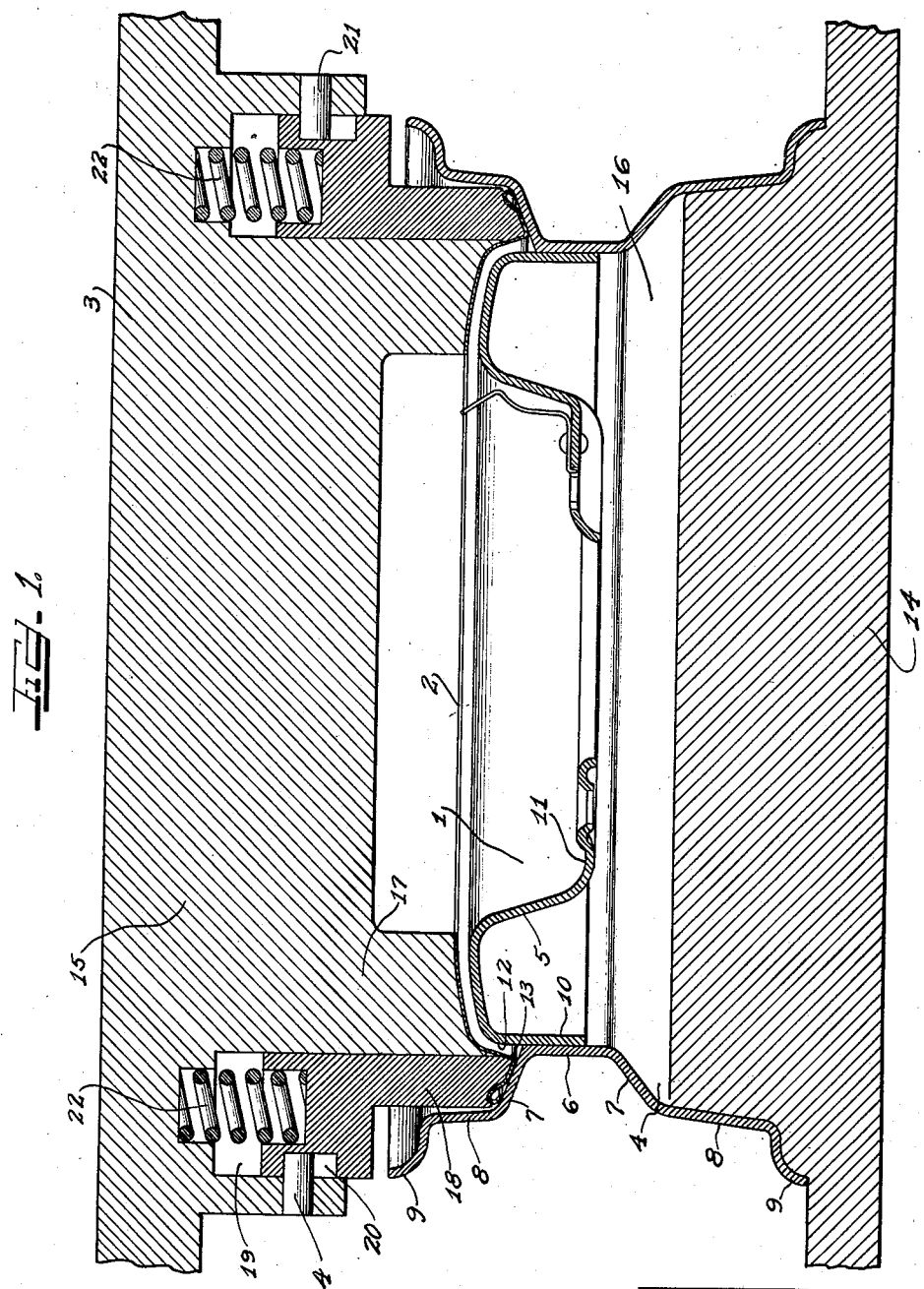

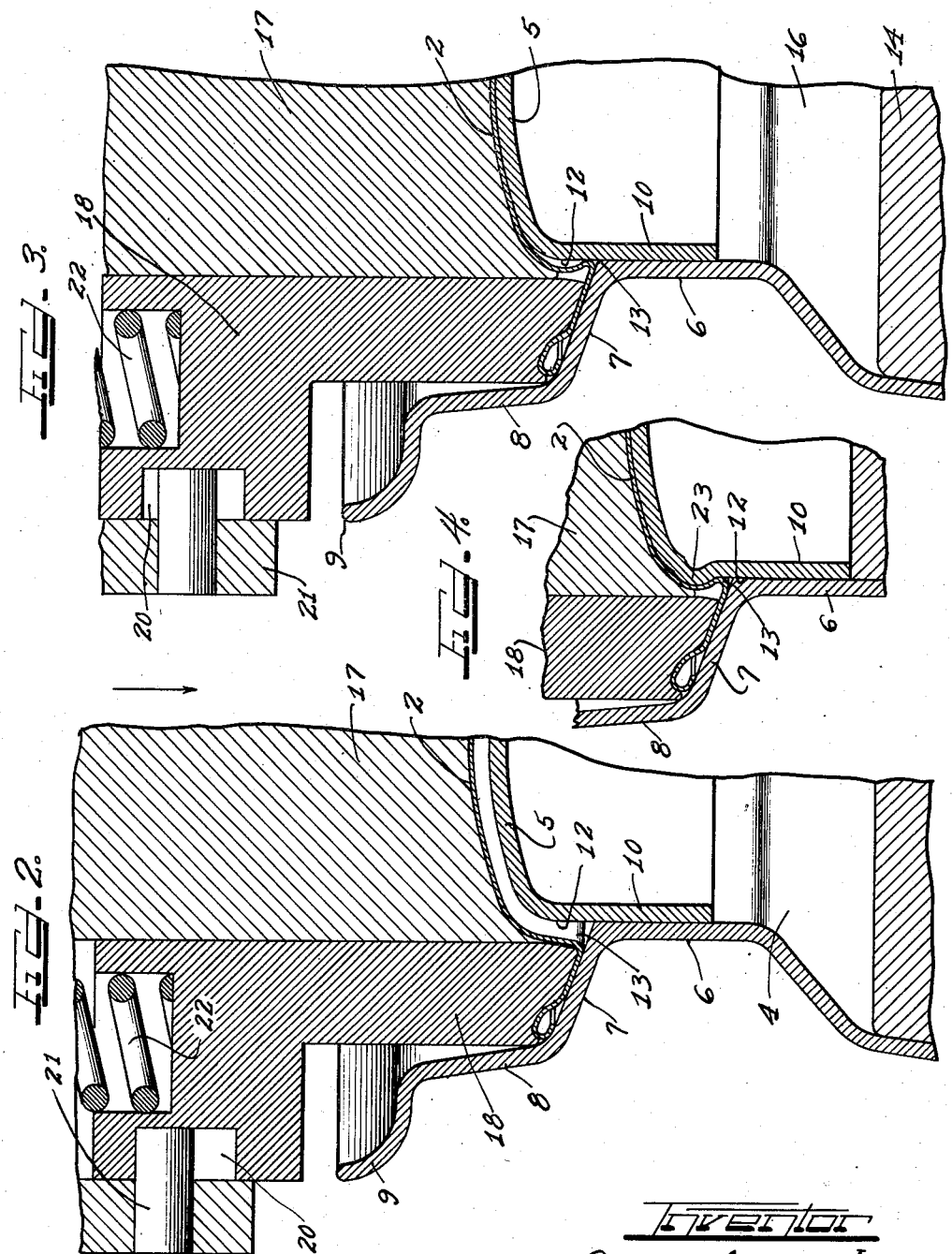

2,163,004

UNITED STATES PATENT OFFICE 2,163,004

WHEEL DISK AND METHOD OF MOUNTING SAME

George Albert Lyon, Allenhurst, N. J.

Application June 17, 1936, Serial No. 85,632

4 Claims. (Cl. 29—159)

This invention relates to an ornamental member, and more particularly to an ornamental member adapted to be disposed over an outer side surface of an automobile or other vehicle wheel and to the method of mounting the same thereon.

It is an object of this invention to provide a novel ornamental accessory for use with automobile or other vehicle wheels which may be so secured in position as not to require any modification or change in the wheel.

It is important in the manufacture and assembly of ornamental devices for disposition on vehicle wheels, that these devices be economical to manufacture, simple to assemble, require no changes of the usual vehicle wheel, and be rugged and reliable in use and substantially free from vibration.

It is an object of this invention to provide a novel ornamental device which possesses the above highly desirable qualities.

It is a further object of this invention to provide a novel method and means for mounting ornamental members on vehicle wheels.

A further feature of this invention is a novel method of securing an ornamental member to a vehicle wheel by a pressing operation.

A still further feature of this invention is a novel method of securing an ornamental member to a vehicle wheel which includes collapsing an intermediate portion of the member and causing the collapsed portion to press firmly against an intermediate portion of the wheel, whereby the member is secured to the wheel.

The novel features which I believe to be characteristic of my invention are set forth with particularity in the appended claims. My invention itself, however, both as to its organization and method of operation together with further objects and advantages thereof, may best be understood by reference to the following description taken in connection with the accompanying drawings in which:

Figure 1 is a cross-sectional elevational view of a wheel, an ornamental member, and a press illustrating one embodiment of my invention;

Figure 2 is an enlarged view of the upper left-hand portion of Figure 1, and shows the press in its position prior to the pressing operation;

Figure 3 is a view similar to Figure 2 but shows the press in its position at the end of the pressing operation;

Figure 4 is a cross-sectional elevational view of a portion of a wheel, an ornamental member, and a press illustrating a modified form of my invention.

Referring to Figure 1 of the drawings, I have illustrated therein a wheel 1 on which an ornamental member 2 is about to be secured with the aid of a press 3, in accordance with the teachings of my invention. Wheel 1 is illustrated as being of the type commonly manufactured for use by various members of the automobile industry, although it is to be understood that my invention is not limited thereby. As shown, wheel 1 comprises a rim portion 4 and a body part 5.

Rim 4 is of the drop center type and includes a base flange 6, opposite side wall portions 7, opposite intermediate flanges 8, and side edges 9. Body portion 5 includes a laterally extending flange 10 at its outer periphery, and a circular holding flange 11 adjacent the center of the wheel. Body part 5 is secured to rim portion 4 in any suitable manner, such as by rivets (not shown). As may be seen upon careful inspection of the drawings, laterally extending flange 10 of body part 5 extends beyond the edge of base flange 6 of rim portion 4, and in consequence thereof forms a shoulder 12 at the junction point of body part 5 and rim portion 4.

In the manufacture of vehicle wheels, it is, as a general rule, impossible to give the outer side surface of the wheel a high polish or a pleasing configuration because of the necessity of using materials having the requisite stress-resisting characteristics and in following a constructional design which is in accordance with sound engineering principles. Various types of ornamental devices have been provided which will enhance the general beauty and appearance of the outer side surface of the wheel. One type of ornamental device which is commonly used, is known to the art as an ornamental member or disk.

Referring again to Figure 1 of the drawings I have shown therein an ornamental member 2 which is about to be secured to a wheel 1 by causing an intermediate portion 13 to collapse into locking engagement with shoulder 12 of the wheel. The collapse of intermediate portion 13 is brought about by placing wheel 1 and member 2 in press 3 and applying an axial pressure thereto in a manner which will presently be explained.

Press 3 comprises a base member 14 and an upper or male die member 15. Base member 14 is provided with an upwardly extending portion 16 which is adapted to lie in intimate contact with the inner surface of rim 4. The top of portion 16 is so disposed as to rest against the inner edge of laterally extending flange 10 and thus provides a seat for the latter. Upper die member 15 of press 3 includes a central die part 17 and an outer annular die part 18 which is slidably mounted in an annular recess 19 of the upper press member 15. Die part 18 is recessed as at 20 in order to cooperate with a plurality of studs 21 to limit the relative movement of die part 18 with respect to central die part 17. It will of course be understood that a circular flange (not shown) may be employed with equal success in the place of studs 21. A plurality of springs 22, disposed as shown in Figure 1, bias die part 18 downwardly with respect to central die part 17.

The relative position of the various elements prior to the pressing operation may be seen best in Figure 2.

The method of mounting ornamental member 2 on wheel 1 is as follows:

Wheel 1 is placed over the upwardly extending portion 16 of base member 14 of press 3 and firmly seated thereon. Ornamental member 2 is placed over the outer side surface of wheel 1 and the upper die member 15 of press 3 is lowered into the position shown in Figures 1 and 2 of the drawings. It will be noted that outer die part 18 firmly engages the outer marginal edge portion of ornamental member 2 and holds the same against the outer side wall 7 of rim 4. Axial pressure in the direction indicated by the arrow in Figure 2 is now applied to central die part 17. The axial movement of central die part 17 causes outer die part 18 to ride upwardly in recess 19 against the compressive action of springs 22. The downward movement of die part 17 causes the ornamental member to buckle or collapse at 13 since that is the only point at which the upper member of the press lies in spaced relation with respect to the outer surface of wheel 1. The relative position of the various elements at the end of the pressing operation and particularly the position of intermediate portion 13 of ornamental member 2 may be seen best in Figure 3 of the drawings. It will be noted upon careful inspection of Figure 3 that intermediate portion 13 of ornamental member 2 is now tightly pressed against shoulder 12 of body part 5, and in consequence thereof is securely fastened to wheel 1.

It will be noted from the above description that during the pressing operation, the wheel itself acts as one of the die members of the press. This is an important feature of my invention as it eliminates the need for a separate female die member which is usually required. Although in the drawings, I have shown the upper die as constituting the male member, it should be understood that the invention is not limited thereby since the wheel may be used with equal success as the male die member and the upper die used as the female member.

In Figure 4 of the drawings I have illustrated a slightly modified form of my invention. On inspection of the figure it will be noted that the wheel is similar to that described in connection with Figures 1 to 3 except that the outwardly extending shoulder 12 is provided with an annular radially extending bead 23 near its outer edge. Intermediate portion 13 of ornamental member 2 is adapted in this case to be collapsed against shoulder 12 at a point immediately beneath bead 23. Figure 4 illustrates the various elements in their relative positions at the end of the pressing operation. It will readily be understood that bead 23 provides a further means for assuring that ornamental member 2 is firmly secured to wheel 1.

While I have shown particular embodiments of my invention, it will of course be understood that I do not wish to be limited thereto since many other modifications may be made, and I therefore contemplate by the appended claims to cover all such modifications which fall within the true spirit and scope of my invention.

I claim as my invention:

1. The method of mounting an ornamental member on a vehicle wheel which includes gripping and holding an annular portion of the member against a face of the wheel in a fixed position with respect thereto and bending a second annular portion of said member radially inwardly into tight securing engagement with said wheel by the application of axial pressure only.

2. The method of mounting a partially preformed sheet metal member on a vehicle wheel which includes confining an outer annular portion of said member against said wheel with a hold-down ring and applying axial pressure to another portion of said member to cause a radial shrinking of an intermediate annular portion of said member into tight mounting engagement with said wheel.

3. The method of mounting an ornamental member on a vehicle wheel, said member including an outer ring portion and an inner portion integral therewith and extending therefrom, the marginal parts of said portions adjacent the annular line of junction thereof defining a reentrant groove, which includes gripping and holding said outer ring portion against a face of said wheel and applying axial pressure to said inner portion to cause a radial collapsing of the metal of said inner portion adjacent said reentrant groove into tight engagement with said wheel.

4. The method of mounting an ornamental member on a vehicle wheel, said member including an outer ring portion and an inner portion integral therewith and extending therefrom, the marginal parts of said portions adjacent the annular line of junction thereof defining a reentrant groove, which includes gripping and holding said outer ring portion against a face of said wheel and applying axial pressure to said inner portion to cause a radial collapsing of the metal of said inner portion adjacent said reentrant groove into tight engagement with said wheel, said wheel acting as a die during the collapsing step for determining the final shape of said member.

GEORGE ALBERT LYON.